May 9, 1961 J. W. BROUILLETTE, JR 2,983,822

FORM RECOGNITION METHOD AND SYSTEM THEREFOR

Filed Sept. 30, 1957 3 Sheets-Sheet 1

INVENTOR:
JOSEPH W. BROUILLETTE JR.

BY T. E. Kristofferson

HIS ATTORNEY.

FORM RECOGNITION METHOD AND SYSTEM THEREFOR

Filed Sept. 30, 1957

INVENTOR:
JOSEPH W. BROUILLETTE JR.
BY T. E. Kristofferson
HIS ATTORNEY.

INVENTOR
JOSEPH W. BROUILLETTE JR.
BY T. E. Kristofferson
HIS ATTORNEY.

United States Patent Office 2,983,822

Patented May 9, 1961

2,983,822

FORM RECOGNITION METHOD AND SYSTEM THEREFOR

Joseph W. Brouillette, Jr., Syracuse, N.Y., assignor to General Electric Company, a corporation of New York Filed Sept. 30, 1957, Ser. No. 687,112

22 Claims. (Cl. 250—202)

This invention relates to a form recognition method and system employing comparisons between invariant functions of a curve and a stored set of such invariant functions for a standard set of curves for recognizing substantial coincidence therebetween. More particularly, the invention relates to such a method and system employing means for recognizing such forms or curves by an invariant which is a function of the polar coordinates with origin at the centroid of arc of the curve in question.

Prior form recognition systems rely in large on a correspondence directly between the stored memory and the curve to be recognized. Such a system requires at least the transformations of rotation, translation, and magnification or demagnification before a correspondence exists. Such transformations are time-consuming and their elimination has been a problem long existing in the art.

This problem has been recognized by applicant and his co-workers and one solution has been offered in application Ser. No. 618,606, filed October 26, 1956, by C. W. Johnson et al. and assigned to the assignee of the present invention. The system has been further implemented as described in application Ser. No. 618,504, filed October 26, 1956, by J. W. Brouillette et al. and in application Ser. No. 618,553, filed October 26, 1953, by C. W. Johnson, both of which are also assigned to the assignee of the present invention. A further refinement is disclosed in application Ser. No. 679,512, now abandoned, filed August 21, 1957, by J. W. Brouillette, also assigned to the assignee of the present invention. Application Serial No. 687,113 by J. W. Brouillette, Form Recognition Method and System, filed concurrently herewith and assigned to the assignee of the present invention, discloses further details of such a system. Accordingly, it is an object of the present invention to provide a form recognition system which can recognize a curve independently of at least its translation and rotation and in some instances also its magnification.

Another object of this invention is to provide means for deriving signals representative of invariant functions of a curve to be recognized.

A further object of this invention is to provide a set of such invariants based on a polar coordinate system having an origin located at the centroid of the arc of a curve to be recognized.

A still further object of this invention is to provide a set of invariant functions which is relatively insensitive to curves having irregular boundaries which have rapid changes in direction involving small changes in amplitude.

In carrying out the invention in one form thereof, signals generated by a curve follower in a form recognition system representative of the $x$ and $y$ components of the points along a curve to be recognized as the curve is scanned by a curve follower are operated on to remove D.C. components in order to translate the origin of the coordinates to a unique point. These translated coordinates are further modified to provide a signal representative of the polar form of coordinates for the curve to be recognized having its origin at the unique point. The polar signal is then operated on to provide further signals which are invariant under at least translation and rotation, and in several instances also under magnification, which may then be compared with a set of similarly derived signals for a standard set of curves for recognition purposes.

More particular embodiments of the invention employ filtering out the D.C. components from the original coordinate system to translate the origin to the centroid of the arc of the curve to be recognized and then converting the signal to polar coordinate form with the origin at the centroid of the arc. The polar signal can then be detected by a peak detector, for instance, to obtain the value of the radius vector which is invariant under translation and rotation. The radius vector signal may then be delayed a given time and subtracted from the undelayed signal to obtain the change in the radius vector over the delay time, which function is also invariant under rotation and translation. The delayed radius vector may also be divided into the radius vector signal to provide a ratio which will be invariant under magnification as well, if the delay time selected is a given portion of the total scan time of the curve to be recognized. Also, both the signals representing the radius vector and the change of radius vector over the delay time may be divided by the total arc length of the curve to make these signals also invariant under magnification. Another specific invariant may be derived by feeding the polar signal through an FM detector to obtain a signal representative of the rate of change of the phase of the radius vector with respect to rate of change of arc which function is invariant under translation and rotation. This signal may then be multiplied by the total arc length of the curve to obtain an additional signal invariant as well under magnification. A further specific invariant may be derived by delaying the polar signal and limiting it and later comparing it with the limited undelayed polar signal in a phase detector to obtain a function of the increment of change of phase of the radius vector over the delay time, which is invariant under rotation, translation and magnification provided that the delay time is a given fraction of the total scan time. A still further invariant may be obtained by limiting the polar signal and comparing its phase in a phase discriminator with that of the velocity vector of the curve having a phase representative of the direction angle of the curve, in order to obtain a function of the angle between the radius vector and the direction angle or tangent to the curve at the point under consideration, which function is invariant under rotation, translation and magnification.

The novel features characteristic of the invention are set forth with particularity in the appended claims. The invention itself, however, together with further objects and advantages thereof can best be understood by reference to the following description taken in connection with the accompanying drawings in which;

Figures 1, 2, 3, 4:
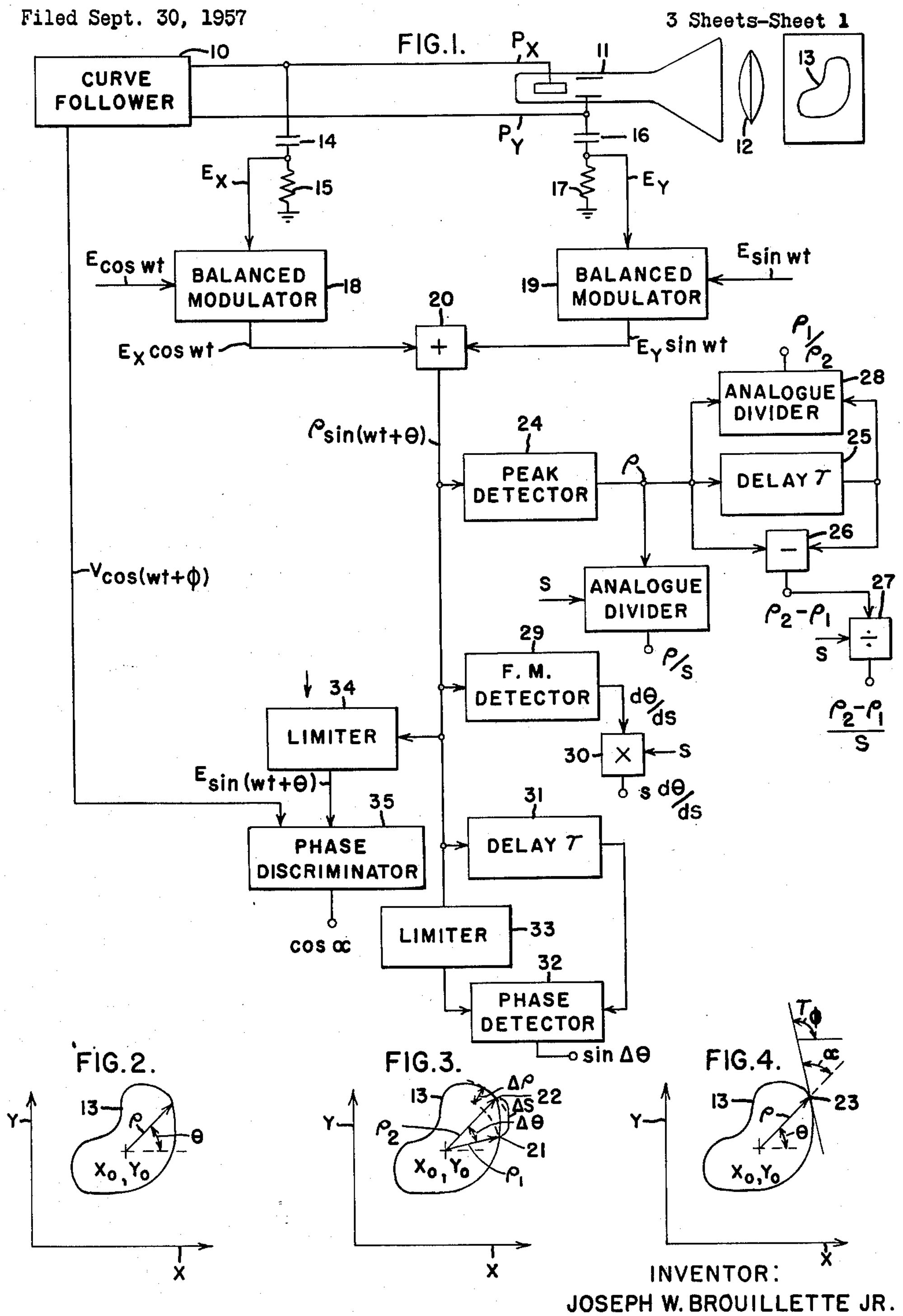
Fig. 1 is a block diagram of a system for deriving invariants of a type related to the arc centroid of the curve to be recognized.
Figs. 2, 3 and 4 are diagrams illustrating the particular angular and coordinate relationships employed in the circuitry of Fig. 1.
Figure 5:
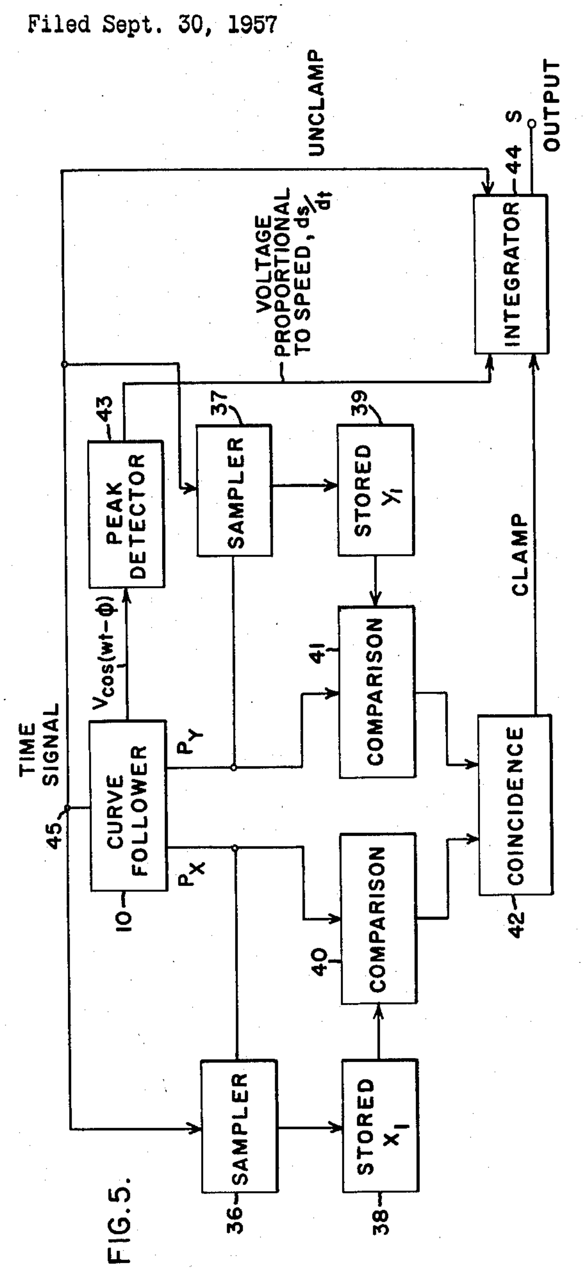
Fig. 5 is a diagram illustrating circuitry for obtaining the integrated total arc length of a curve being processed.
Figure 7:
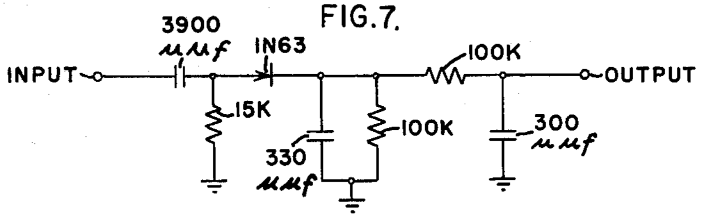
Figure 8:
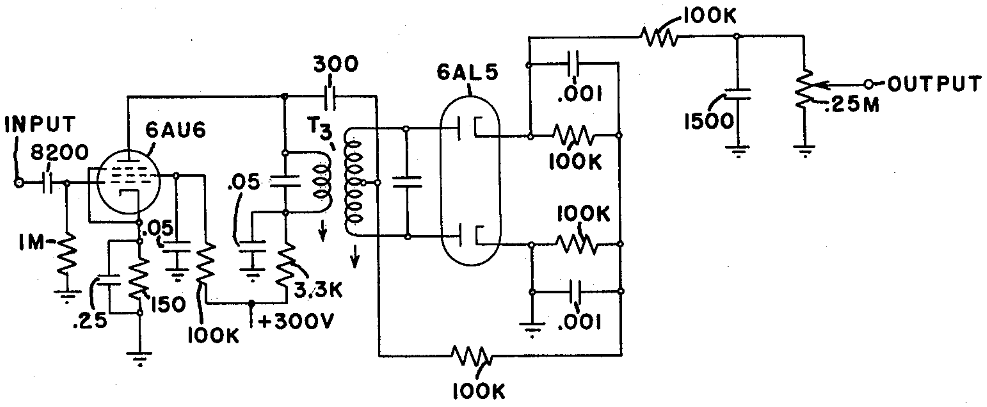

Fig. 7 is a circuit diagram of peak detector 24 of Fig. 1 which is similar to peak detector 43 of Fig. 5; and Fig. 8 is a circuit diagram of FM detector 29 of Fig. 1.

It is understood, of course, that the values shown on the detailed circuitry are solely illustrative of embodiments of the invention which have been constructed, in order to facilitate the practice of the invention and to conserve the effort necessary by those skilled in the art in doing so. These values are no way intended to limit the invention thereto, but are merely given by way of example, the true scope of the invention being defined by the appended claims.

Turning now to the drawings, in Fig. 1 a form recognition system is illustrated which embodies a portion of the system disclosed in the previously mentioned application Ser. No. 618,553 as well as the invention herein disclosed. The curve follower 10, cathode ray tube 11, lens 12 and curve 13 to be recognized may be identical to those disclosed in application Ser. No. 618,553. The horizontal deflection plates of cathode ray tube 11 have applied thereto a voltage representative of the value of the $x$ coordinate and the vertical deflection voltage applied to the vertical deflection plates of tube 11 are representative of the $y$ coordinate of a spot on the screen of tube 11 in a right handed orthogonal cartesian coordinate system having an origin at the center of cathode ray tube 11. The horizontal deflection voltage, designated $P_x$ in Fig. 1, is filtered through a capacitor 14 and a resistor 15, connected between the horizontal deflection plate and ground, to remove the D.C. components from the signal. The vertical deflection signal, designated $P_y$, is similarly treated by filtering it through a capacitor 16 and a resistor 17, connected between the vertical plates and ground. The signal appearing across resistor 15, designated as $E_x$, is then representative of only the alternating current components of $P_x$ and the signal occurring across resistor 17, designated $E_y$, is likewise representative of only the A.C. components of the signal on the vertical deflection plates.

The signals $E_x$ and $E_y$ are thus representative of the $x$ and $y$ coordinates of the point on the curve 13 at which the scan spot is presently located, referred to the centroid of arc of the curve 13. This process has thus translated the origin of the curve from the center of cathode ray tube 11 to the centroid of arc of curve 13. At least one complete scan of curve 13 is necessary to locate this centroid and more than one may be employed.

The signals $E_x$ and $E_y$ are fed to a pair of balanced modulators 18 and 19 respectively. An additional signal $E \cos wt$, which can be picked off from the curve follower 10 disclosed in application Ser. No. 618,553 is also fed to balanced modulator 18 and a similar signal $E \sin wt$, picked off from curve follower 10, is fed to balanced modulator 19. The outputs of balanced modulators 18 and 19 are then $E_x \cos wt$ and $E_y \sin wt$ respectively.

These outputs of balanced modulators 18 and 19 are added in an adder 20, which is similar to the adder 48 in application Ser. No. 618,504, which performs right triangle solution, in order to obtain a signal equal to $\sqrt{E_x^2+E_y^2} \sin (wt+\theta)$ which is equal to $\rho \sin (wt+\theta)$ or the polar form of the signal representing the curve 13 with origin at the centroid of arc of the curve. An example of such an adder may be found in Korn and Korn, "Electronic Analogue Computers," second ed., McGraw Hill Book Co., Inc., New York, 1956, chap. 1, pp. 13–14.

The above terminology is similar to that found in the referenced prior applications. For further clarification, the frequency $w$ is equal to $2\pi f$ where $f$ is the frequency of rotation of the scan spot of cathode ray tube 11. The various angular relationships are shown in Fig. 2 which shows an $x$ and $y$ coordinate system with an origin intersecting at the center of the face of cathode ray tube 11. The curve 13 is shown somewhat displaced from the origin of the $x$ and $y$ coordinate system, and the above described filtering action has translated the origin from that of the $x$ and $y$ coordinates to the origin of the centroid of the curve 13 defined by the points $x_0$ and $y_0$ shown in Fig. 2. The polar representation of the curve 13 with origin at $x_0$ and $y_0$ is then defined by the radius vector $\rho$ from the centroid to a point on the curve 13 and the phase angle $\theta$ between the radius vector and an axis parallel to the $x$ axis.

The signal $\rho \sin (wt+\theta)$ may be operated on in several ways to obtain information concerning the curve 13 for generating functions which are invariant under translation, rotation and magnification, and which are based on the coordinate system with origin at the centroid of the arc of the curve 13. The centroid of the arc has been taken as a convenient unique point for origin of the coordinate system used. It will be understood, however, by those skilled in the art that other unique points would serve as well to carry out the invention disclosed. An example of another unique point would be the centroid of the area of the curve 13. The centroid of the arc has been selected because of resulting simplifications in the circuitry employed making this particular unique point advantageous.

Several functions which are invariant under translation and rotation in the polar system of coordinates selected are as follows:

The function $\rho$ or the amplitude of the radius vector. The function represented by $\rho_2-\rho_1$ or the change in amplitude of the radius vector over an increment of time. The function $$\frac{d\theta}{ds}$$

or the rate of change of phase of the radius vector with respect to the rate of change of arc length along the curve.

Examples of functions which are invariant under magnification as well are as follows:

The ratio $\rho_1/\rho_2$ or the ratio between the radius vector at a given time and at a previous time a fixed portion of the total sweep of the curve 13 away. The function $$\frac{\rho}{S}$$

or the value of the radius vector divided by the total length of the curve. The function $$\frac{\rho_2-\rho_1}{S}$$

or the ratio of the change in $\rho$ over a fixed time divided by the total length of the curve. The function $S$ $$\frac{\theta}{dS}$$

or the product of the total length of the curve by the rate of change of the phase of the radius vector with respect to the rate of change of arc along the curve. The functions $\sin \Delta\theta$ or $\cos \Delta\theta$ where $\Delta\theta$ is a given increment of change of the phase of the radius vector, the cosine or sine of $\alpha$ where $\alpha$ is the angle between the radius vector $\rho$ and the direction angle of the curve $\phi$ The additional terminology employed above is illustrated in Figs. 3 and 4. In Fig. 3, there is shown two radius vectors $\rho_1$ and $\rho_2$ drawn to points 21 and 22 along the curve 13 respectively. The angle between $\rho_1$ and $\rho_2$ is $\Delta\theta$. The arc distance between the points 21 and 22 is $\Delta S$. $\Delta\rho$ is equal to $\rho_1-\rho_2$ as indicated. The origin again is at $x_0$ and $y_0$, the centroid of arc of the curve 13.

The curve follower 10 may be operated in the manner described in the referenced prior applications, such that the time of sweep of the segment $\Delta S$ is a given portion of the total sweep time necessary to traverse the curve 13. This operation will standardize all the increments involved.

In Fig. 4, the curve 13 is again illustrated with origin at $x_0$ and $y_0$, the centroid of arc. The radius vector $\rho$ is drawn at an angle $\theta$ with respect to a reference axis parallel with the $x$ axis to a point 23 on the curve 13, and extended beyond the curve in the form of a dashed line. An additional line T is drawn tangent to the curve at the point 23. This line represents the direction angle of the curve as described in application Ser. No. 679,512. The direction angle with respect to the $x$ axis is illustrated as $\phi$. The angle between the radius vector $\rho$ and the direction angle is illustrated as angle $\alpha$ and can be seen to be equal to $\phi-\theta$.

Returning now to the circuit of Fig. 1, the invariants listed and described above may be instrumented as follows:

The output of adder 20 is fed through a peak detector 24, in order to derive a signal representative of the amplitude of the radius vector $\rho$. This signal is invariant under translation and rotation. The output of peak detector 24 may be delayed by feeding it through a delay 25, such as the audio delay line disclosed in application Ser. No. 679,512 to provide a fixed delay time. The delayed signal output of delay 25 may then be subtracted from the output of peak detector 24 in a subtraction circuit 26, in order to obtain a signal representative of the function $\rho_2-\rho_1$ which is also invariant under rotation and translation. The output from subtraction circuit 26 may be fed to an analogue dividing circuit 27 and divided by a signal S representative of the total arc length of curve 13, in order to obtain the function $$\frac{\rho_2-\rho_1}{S}$$

which is invariant as well under magnification. Subtraction circuit 26 may be of the type disclosed in chapter 1 pp. 13–14 of the above referenced book by Korn & Korn. This is a special case of addition where the minuend is inverted Z(−1) and summed with the subtrahend. Analogue dividing circuit 27 may be of the type disclosed in the Korn & Korn reference in chapter 6 pp. 338–340.

The total arc length S may be derived from curve follower 10 in the manner illustrated in Fig. 5. Curve follower 10 has outputs $P_x$ and $P_y$ as illustrated in Fig. 1. These are the same voltages supplied to the deflection plates of tube 11. The value of $P_x$ is sampled in sampler 36 and the value of $P_y$ is sampled in sampler 37 at the beginning of a recognition cycle. The sampled values are stored as $x_1$ and $y_1$ in storage devices 38 and 39 respectively. The voltage $P_x$ is continually compared to the stored $x_1$ in a comparison circuit 40 which, for example, may be a Schmitt trigger circuit which generates a pulse when its two inputs are substantially equal. The voltage $P_y$ is similarly monitored in a comparison circuit 41. When the curve follower passes the point $x_1$, $y_1$ pulses will be emitted simultaneously. The signals from comparison circuits 40 and 41 are supplied to a coincidence circuit 42 which will develop an output only if both inputs are simultaneously activated.

There is also developed in curve follower 10 a carrier $V \cos (wt-\phi)$ as described in the above referenced application Ser. No. 618,553, whose amplitude is proportional to the speed of the tracing circle along the arc of curve 13. The carrier is supplied to a peak detector 43, whose output is proportional to the speed. This output is supplied to an integrator 44.

At the beginning of the cycle integrator 44 is unclamped by the same time signal that actuates the $x_1$, $y_1$ samplers. This is shown in Fig. 5 as a signal applied to a terminal 45. When $x_1$, $y_1$, is reached the second time, coincidence circuit 42 supplies a clamping pulse to integrator 44. During the first tracing period the output of integrator 44 rises linearly at a rate proportional to the speed $ds/dt$. The output is then $$\int_0^t \frac{ds}{dt}dt=S$$

the perimeter.

In addition, the output of delay 25 may be divided into the output of peak detector 24 to obtain the function $\rho_1/\rho_2$ using an analogue divider 28 similar to divider 27. This function is also invariant under magnification as well as translation and rotation.

The invariant $d\theta/ds$ may be derived by feeding the output of adder 20 through an FM detector 29 in the manner disclosed in the referenced concurrently filed Serial No. 687,113. $d\theta/ds$ is invariant under translation and rotation and may in turn be made invariant under magnification by feeding the output of FM detector 29 through a multiplication circuit 30 and multipling it by S, the total arc length of the curve 13, to obtain the function S $d\theta/ds$. An example of such a multiplier circuit may be found in the above referenced Korn & Korn publication chapter 6 pp. 251–284.

The function sin $\Delta\theta$ or cos $\Delta\theta$ may be obtained by delaying the output of adder 20 by feeding it through a delay 31 similar to either the magnetic drum or the audio delay line type of delay described in application Ser. No. 679,512 and then applying the output of delay 31 to one input of a phase detector 32, similar to that disclosed in Fig. 8 of application Ser. No. 679,512. The other input to phase detector 32 is derived by passing the output of adder 20 through a limiter circuit 33, such as is disclosed in Ser. No. 679,512. The output of phase detector 32 will then be either sin $\Delta\theta$ or cos $\Delta\theta$, which are invariant under translation, rotation or magnification.

The invariant represented by the functions sin $\alpha$ or cos $\alpha$ may be obtained by limiting the output of adder 20 in a limiter 34 to obtain a signal $E \sin (wt+\theta)$ having a constant amplitude, which is in turn applied to a phase discriminator 35, similar to that disclosed in application Ser. No. 618,504 Fig. 11, and comparing the phase of $\theta$ with the phase of the signal representative of the direction angle $\phi$ of the curve 13, $V \cos (wt+\phi)$, which may be picked off of curve follower 10. The output of phase discriminator 35 will then be either sin $\alpha$ or cos $\alpha$ which are invariant under translation, rotation and magnification.

Figure 6:
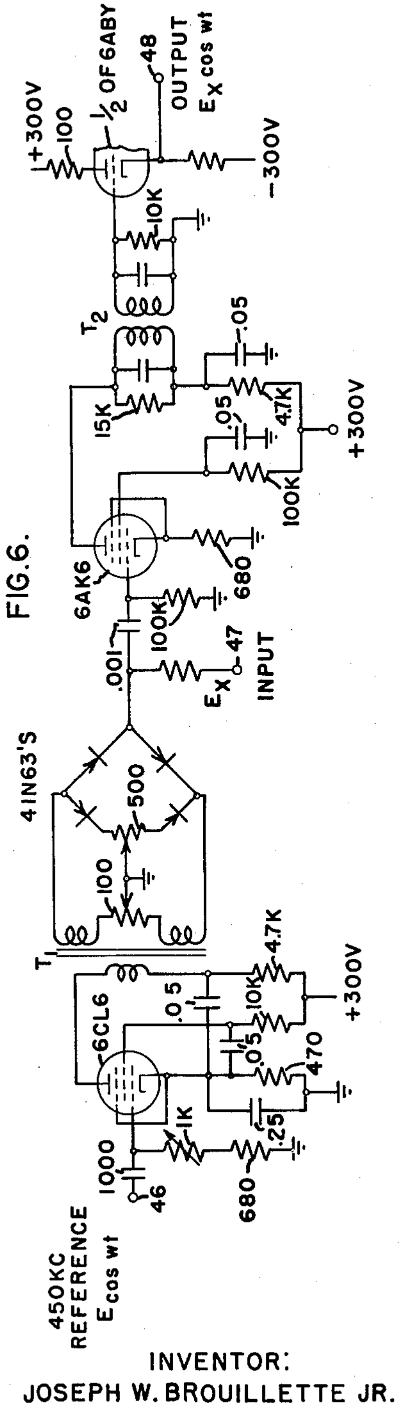
Fig. 6 is a circuit diagram of balanced modulator 18 of Fig. 1 which is also similar to balanced modulator 19.

The diagram of Fig. 6 illustrates the circuitry of balanced modulator 18 of Fig. 1 in detail. This is similar to balanced modulator 19 and operates the same as balanced modulators 46 and 47 disclosed in the above referenced application Ser. No. 618,504, pp. 53–54. The values given on the circuit diagram of Fig. 6 are in ohms and microfarads unless otherwise indicated and are only intended to be representative values which may be employed and the invention is not to be implied to be limited thereto.

The reference input $E \cos wt$ picked off of curve follower 10 is applied to input terminal 46. The voltage $E_x$ from across resistor 15 of Fig. 1 is applied to input terminal 47 and an output $E_x \cos wt$ appears from output terminal 48 across the ½ 6ABY cathode follower.

The transformer $T_1$ is a special transformer wound on a Ferramic "G" F–624–2 torodal ferrite core. This was made by winding a 77 turn primary of #35 enameled wire. Two secondaries were wound, each of #35 enameled wire, and each having 19 turns. The inductance of the primary is approximately 6.5 millihenries and the inductances of the secondaries are both approximately 138 microhenries. In the construction, great care was exercised to get substantially the same coupling from each of the secondaries to the primary, so that equal and opposite voltages are induced in the secondary windings. The transformer function could be performed by any transformer having well balanced secondaries that has been designed for the proper frequency range, as for example a so-called "hybrid" transformer.

Transformer $T_2$ is a Meissner 16–6659 450 kc. I.F. Transformer.

Fig. 7 illustrates detailed circuitry for peak detector 24 of Fig. 1. Again representative values are shown on the drawing which are not intended to be limiting but descriptive. The mode of operation of the peak detector illustrated in Fig. 7 is well known to those skilled in the art.

Fig. 8 is a detailed circuit diagram of one possible embodiment of an F.M. discriminator such as F.M. detector 29 of Fig. 1. The values shown on both Figs. 7 and 8 are also in ohms or microfarads unless otherwise indicated. Again these values are merely considered to be representative and not limiting. Transformer $T_3$ is a Meissner 450 kc. discriminator transformer. The circuit of Fig. 8 is a well known Seely-Foster circuit and operates in a manner familiar to those skilled in the art. Such a circuit is discussed more fully in the above referenced con-currently filed application Serial No. 687,113.

Recognition of a curve 13 by means of the above described invariant functions is based on detecting the presence of a characteristic waveform which does not depend on the position of the curve 13. This may be accomplished by displaying an invariant function on a cathode ray tube covered by a stencil cut to the proper shape. A photo cell and pulse width discriminator yield a signal when the waveform substantially matches the stencil. This recognition apparatus is described in application Ser. No. 679,512.

The above described invariants have in common the useful property of being more sensitive to the general shape of a curve than to local properties. A ragged curve, which changes drastically in direction over short distances, will not effect the length or phase of the radius vector to any great degree, and thus the polar coordinates measure properties which are relatively insensitive to small changes in magnitude and large ones in direction. This property is valuable when examining such things as printed or typed material where each character has ragged edges due to local variations in type, paper and ink.

While the principles of the invention have now been made clear in the illustrative embodiments, there will be immediately obvious to those skilled in the art many modifications in structure, arrangement, proportions, elements, components used in the practice of the invention and otherwise which are particularly adapted for specific environments in operating requirements without departing from these principles. The appended claims are therefore intended to cover and embrace any such modification within the limits only of the true spirit and scope of the invention.

What I claim is new and desire to secure by Letters Patent of the United States is:

1. Apparatus for curve recognition comprising, means for generating signals representative of coordinates of a curve to be recognized with respect to fixed axes, means operating on said signals for translating the origin of said coordinates to a unique point, means for converting said translated signals into a proper representative of the polar representation of said curve with origin at said unique point, means for operating on said polar signal to generate an invariant function representative of said curve and means for comparing said invariant function with similarly derived functions for a set of standard curves for recognition purposes.

2. Apparatus for generating a function representative of a curve to be recognized by a form recognition system comprising, means for generating signals representative of coordinates of a curve to be recognized with respect to fixed axes, means operating on said signals for translating the origin of said coordinates to a unique point, means for converting said translated signals into a signal representative of the polar representation of said curve with origin at said unique point, means for operating on said polar signal to generate an invariant function representative of said curve.

3. Apparatus for curve recognition comprising, means for generating signals representative of coordinates of a curve to be recognized with respect to fixed axes, means for filtering out substantially all of the D.C. component from said signals in order to translate the origin of said coordinates to the centroid of the arc of said curve, means for converting said filtered signals into a signal representative of the polar representation of said curve with origin at said centroid, means for operating on said polar signal to generate a function representative of said curve which is invariant under at least translation and rotation and means for comparing said invariant function with similarly derived functions for a set of standard curves to register substantial correspondence therebetween for recognition purposes.

4. The apparatus of claim 3 in which said invariant function is invariant also under magnification.

5. Apparatus for generating functions representative of a curve to be recognized by a form recognition system comprising, means for generating signals representative of coordinates of a curve to be recognized with respect to fixed axes, means for filtering out substantially all of the D.C. components from said signals in order to translate the origin of said coordinates to the centroid of the arc of said curve, means for converting said filtered signals into a signal representative of the polar representation of said curve with origin at said centroid, and means for operating on said polar signal to generate a function representative of said curve which is invariant under at least translation and rotation.

6. The apparatus of claim 5 in which said invariant function is invariant also under magnification.

7. The apparatus of claim 5 in which said means for operating on said polar signal comprises peak detecting means to generate a signal representative of the amplitude of the radius vector from said centroid.

8. The apparatus of claim 5 in which said means for operating on said polar signal comprises an FM detector for deriving the rate of change of the phase angle of the radius vector with respect to arc length.

9. The apparatus of claim 5 in which said means for operating on said polar signal comprises means for delaying said polar signal a fixed increment of time and means for detecting the difference in the phase of said polar signal and said delayed signal for deriving a signal representative of a function of the phase angle between the radius vector and the delayed radius vector.

10. The apparatus of claim 5 in which said means for operating on said polar signal comprises a peak detector for generating a signal representative of the amplitude of the radius vector from said centroid, means for delaying said signal representative of said radius vector a fixed time and means for subtracting said delayed signal from said signal representative of said radius vector to obtain the difference or change in amplitude of said radius over said fixed time.

11. The apparatus of claim 6 in which said means for operating on said polar signal comprises means for limiting the amplitude of said polar signal to remove amplitude variations therefrom, means for deriving a signal having a phase representative of the direction angle of said curve, and phase discriminating means for deriving a signal representative of a function of the difference in phase between said polar signal and said direction angle.

12. The apparatus of claim 6 in which said means for operating on said polar signal comprises peak detecting means to generate a signal representative of the amplitude of the radius vector from said centroid, means for integrating around the arc of said curve to obtain a signal representing the total length thereof and means for dividing said signal representative of the amplitude of the radius vector by said signal representing the total length of said curve.

13. The apparatus of claim 6 in which said means for operating on said polar signal comprises an F.M. detector for deriving the rate of change of the phase angle of the radius vector with respect to arc length and means to adjust the rate of tracing around said curve to a fixed time.

14. The apparatus of claim 6 in which said means for operating on said polar signal comprises means for delaying said polar signal a fixed increment of time, means for detecting the difference in the phase of said polar signal and said delayed signal for deriving a signal representative of a function of the phase angle between the radius vector and the delayed radius vector and means to adjust the rate of tracing around said curve to a fixed time.

15. The apparatus of claim 6 in which said means for operating on said polar signal comprises a peak detector for generating a signal representative of the amplitude of the radius vector from said centroid, means for delaying said signal representative of said radius vector a fixed time, means for subtracting said delayed signal from said signal representative of said radius vector to obtain a signal giving the difference or change in amplitude of said radius vector over said fixed time, means for integrating around the arc of said curve to obtain a signal representing the total length thereof, and means for dividing said signal giving said difference or change in amplitude by said signal representing the total length of said curve.

16. The apparatus of claim 6 in which said means for operating on said polar signal comprises a peak detector for generating a signal representative of the amplitude of the radius vector from said centroid, means for delaying said signal representative of said radius vector a fixed portion of the time necessary to scan the complete curve and means for dividing said signal representative of said radius vector by said delayed signal.

17. Apparatus for generating signals for form recognition comprising, means for generating signals representative of the rectangular coordinates af a curve, means for eliminating D.C. components from said signals, means for converting said signals into a signal representative of the polar coordinates of said curve with origin at the centroid of tthe arc thereof, and means for operating on said polar signal to generate an invariant function representative of said curve.

18. Apparatus for deriving an invariant function representing the length of the radius vector from the arc centroid of a curve comprising; means for generating an electron beam, means for focusing the beam to a spot on a search surface, means for displaying a curve to be followed on the search surface, means for deflecting the beam so as to move the spot in a small search circle at a predetermined constant frequency, means for deriving a voltage pulse each time the spot crosses the curve, means for generating a carrier voltage having a frequency equal to the predetermined frequency of rotation of said spot, means for modulating the frequency of said carrier voltage by varying its phase in response to variations in the time occurrence of said voltage pulses, discriminating means to obtain components of said modulated carrier representative of the direction of said curve with respect to fixed axes, means for integrating these components to obtain signals representative of positions with respect to fixed axes, means for eliminating D.C. components from said integrated signals, means for converting said integrated signals into a signal representative of the polar coordinates of said curve with origin at the centroid of the arc thereof, and means for operating on said polar signal to generate an invariant function representative of said curve.

19. The apparatus of claim 18 in which the means for operating on said polar signal comprises means for detecting the peak amplitude thereof providing a signal representative of the radius vector from the centroid.

20. The apparatus of claim 18 in which the means for operating on said polar signal comprises means for detecting including an FM detector to derive the rate of change of the angle of the radius vector with respect to the rate of change of arc of the curve.

21. The apparatus of claim 18 in which the means for operating on said polar signal comprises means for delaying the polar signal a fixed time and means for detecting the phase difference between the polar signal and the delayed polar signal to obtain a signal representative of a function of the angle of rotation of the radius vector over said fixed time.

22. The apparatus of claim 19 including the means for delaying said signal representative of the radius vector a fixed time and means for subtracting said delayed signal from the signal representative of the radius vector in order to obtain a signal representative of the change or difference in length of the radius vector.

References Cited in the file of this patent

UNITED STATES PATENTS

| | | |
|---|---|---|
| 2,610,789 | Hales | Sept. 16, 1952 |
| 2,738,499 | Sprick | Mar. 13, 1956 |
| 2,781,169 | Donan | Feb. 12, 1957 |

OTHER REFERENCES

"Circuit Adds Vectors," by Hindall & Donan Radio Electronics Mag., pp. 76 and 77, February 1951.

UNITED STATES PATENT OFFICE

CERTIFICATE OF CORRECTION

Patent No. 2,983,822 May 9, 1961

Joseph W. Brouillette, Jr.

It is hereby certified that error appears in the above numbered patent requiring correction and that the said Letters Patent should read as corrected below.

Column 7, line 54, for "proper" read -- signal --.

Signed and sealed this 17th day of October 1961.

(SEAL)
Attest:

ERNEST W. SWIDER
Attesting Officer

DAVID L. LADD
Commissioner of Patents

USCOMM-DC